(No Model.)  2 Sheets—Sheet 1.

W. F. DAVIS.
WATER JACKET FOR CYLINDERS OF ENGINES.

No. 605,405. Patented June 7, 1898.

Witnesses:
Fred Gulack
Oliver C. Dennis

Inventor
Wm. F. Davis
By Perrin & Fisher
Attorneys.

(No Model.) 2 Sheets—Sheet 2.

W. F. DAVIS.
WATER JACKET FOR CYLINDERS OF ENGINES.

No. 605,405. Patented June 7, 1898.

Witnesses:
Fred Gerlach
Oliver C. Dennis

Inventor:
Wm. F. Davis
By Peirce & Fisher
Attorneys.

United States Patent Office.

WILLIAM F. DAVIS, OF WATERLOO, IOWA, ASSIGNOR TO THE DAVIS GASOLINE ENGINE WORKS COMPANY, OF SAME PLACE.

WATER-JACKET FOR CYLINDERS OF ENGINES.

SPECIFICATION forming part of Letters Patent No. 605,405, dated June 7, 1898.

Application filed May 7, 1897. Serial No. 635,519. (No model.)

*To all whom it may concern:*

Be it known that I, WILLIAM F. DAVIS, a resident of Waterloo, in the county of Blackhawk, State of Iowa, have invented certain new and useful Improvements in Water-Jackets for Cylinders of Engines, of which I do declare the following to be a full, clear, and exact description, sufficient to enable others skilled in the art to make and use the same.

The present invention has for its object to provide a simple and effective construction of water-jacket more especially designed for the cylinders of explosive-engines, the object of the invention being to permit the jacket to be readily constructed and to be secured to the cylinder in such manner that a thoroughly water-tight connection between the jacket and the cylinder shall be had, so that all danger of leakage or loosening of parts incident to the contraction and expansion of the cylinder shall be avoided.

With this object in view the invention consists in the novel features of construction hereinafter described, illustrated in the accompanying drawings, and particularly pointed out in the claims at the end of this specification.

Figure 1:
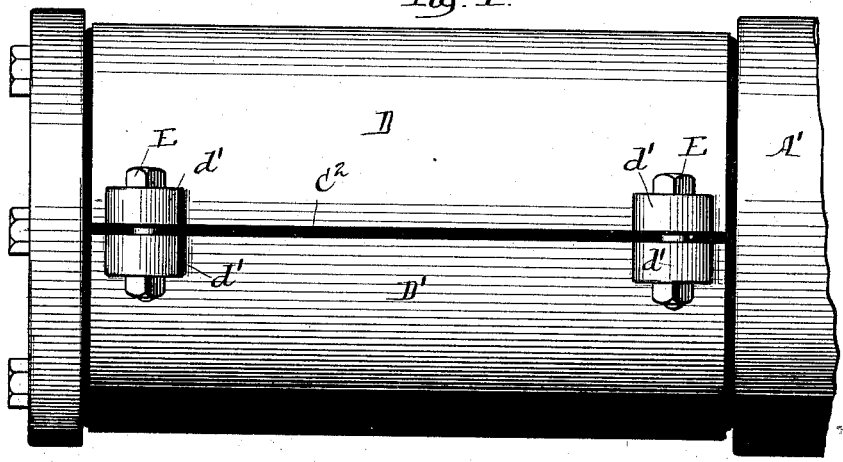
Figure 2:
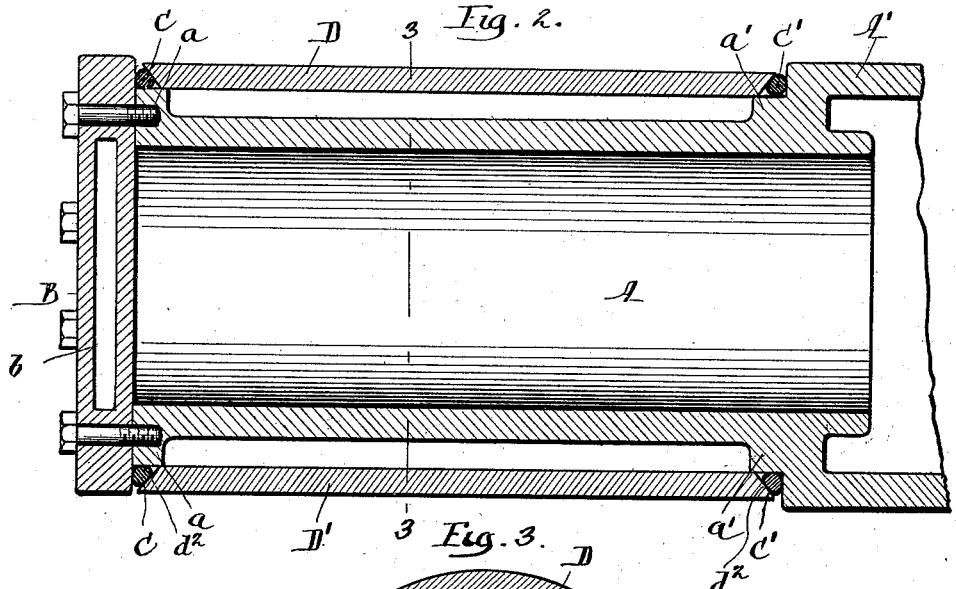
Figure 3:
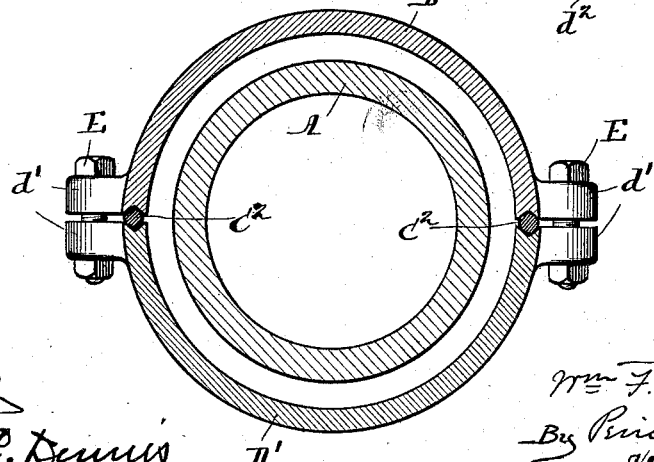
Figure 4:
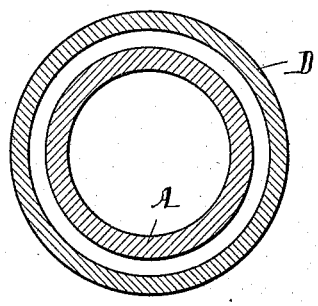
Figure 5:
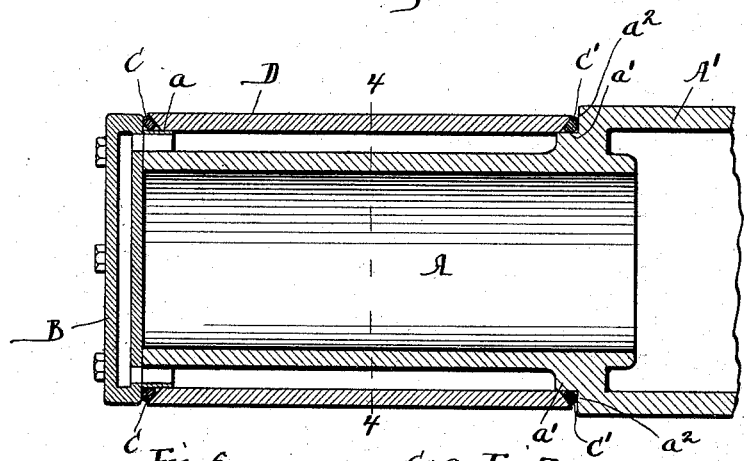
Figure 6:
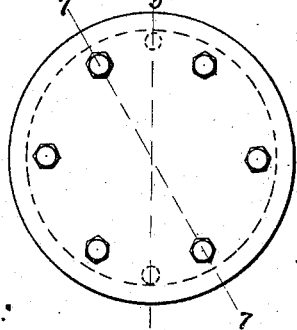
Figure 7:
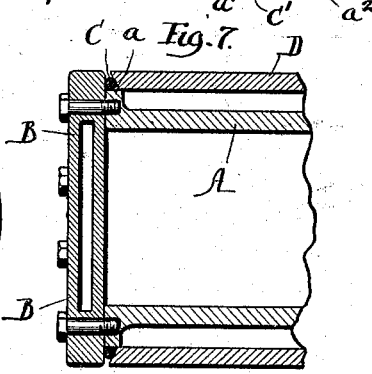

Figure 1 is a view in side elevation, showing the cylinder of an explosive-engine having my invention applied thereto. Fig. 2 is a view in central longitudinal section. Fig. 3 is a view in vertical cross-section on line 3 3 of Fig. 2. Fig. 4 is a view in vertical cross-section on line 4 4 of Fig. 5. Fig. 5 is a view in vertical longitudinal section, showing modified form of the invention. Fig. 6 is an end view of the cylinder shown in Fig. 5. Fig. 7 is a view in longitudinal section through a portion of the cylinder on line 7 7 of Fig. 6.

A designates the cylinder of one familiar type of engine; but it is manifest that the invention can be applied as well to cylinders of various types. The cylinder A is shown as provided at one end with the head B, that will be furnished with a water-space $b$. This water-space may be connected with the annular water-space that encircles the cylinder A, although this is not an essential feature of this invention. The head B may also be provided with ports of usual or suitable construction; but as these form no part of the present invention they need not be particularly described. Adjacent the head B the body of the cylinder A is shown as provided with an annular raised rib or flange $a$, and at the opposite end of the cylinder is formed a corresponding annular flange $a'$. The flange $a$ terminates below the periphery of the cylinder-head B, and the flange $a'$ is of less height than the raised portion $A'$ of the adjacent portion of the cylinder. Upon the flanges $a$ and $a'$ rest the packing-rings C and C', these packing-rings being formed of suitable elastic material, preferably soft rubber. Against the packing-rings C and C' bear the inclined ends of the jacket, which in the constructions shown in Figs. 1 to 3 is formed of sections D and D'; each of these sections being preferably of approximately semicylindrical shape and being formed also by preference with flanges $d'$, through which will pass the retaining-bolts E, whereby the jacket-sections are securely held in place. Between the opposing edges of the jacket-sections D D' are interposed packing-strips $C^2$, and these strips $C^2$ are by preference round and made of soft rubber or like elastic material and by preference, also, the edges of the jacket-sections are formed with inclined or grooved seats $d^2$, within which the packing-strips $C^2$ will set.

In applying my improved water-jacket to the cylinder of an engine the packing-rings C and C' will be placed in position, and the segmental sections D and D' of the jacket will then be set in place, and the packing-strips $C^2$ will be interposed between the edges of the jacket-sections. The bolts E will then be tightened, so as to firmly draw the inclined ends $d$ of the jacket-sections against the round packing-rings C and C', thus spreading the rings and securing a perfectly water-tight joint at the ends of the jacket. The opposing edges of the jacket-sections will also compress the interposed packing-strips $C^2$, and thus effectively guard against leakage of water about the edges of the sections.

By employing a water-jacket formed of separate longitudinal sections it will be thus seen that a most effective means is provided for securing a perfectly water-tight connection between the water-jacket and the cylinder and in case of breakage or injury of the jacket the sections can be quickly removed for replacement and repairs, and this, too, without the necessity of withdrawing the cylinder-head or disturbing any other part of the engine.

So far as I am aware my invention presents the first instance of a water-jacket formed of longitudinal sections, and I do not wish, therefore, that the invention should be understood as restricted to the details of construction above set out except where such details are specifically recited in the following claims.

So, also, so far as I am aware my invention presents the first instance of a gas-engine the cylinder of which is provided at its ends with raised annular ribs or flanges upon which rest packing-rings, against which rings bear the ends of a water-jacket, the cylinder-head closing against one of said packing-rings. Except as specifically defined in the claims hereinafter recited I do not wish the invention to be understood, therefore, as restricted to the construction above defined, since the broader feature of my invention may be employed with advantage without the water-jacket being formed of longitudinal sections, although such last-mentioned construction is the preferred one.

In Figs. 4 and 5 of the drawings the cylinder A is the same in construction as hereinbefore described, the ends of the cylinder being provided with the raised ribs or flanges $a$ and $a'$, upon which rest the packing-rings C and C', the ring C' bearing against a shoulder $a^2$, that rises from the rib or flange $a'$. In this form of the invention the jacket consists of a cylinder the ends of which are preferably beveled and rest upon the ribs $a$ and $a'$ of the cylinder, the beveled faces of the jacket ends bearing against the packing-rings C and C'. In this form of the invention, as in that hereinbefore described, the cylinder-head B abuts against the packing-ring C, thus tightly clamping the ring against the end of the jacket and securing a perfectly water-tight joint at such point and as well, also, forcing the opposite end of the jacket tightly against the packing-ring C', which is held upon the rib or flange $a'$ and against the annular shoulder $a^2$. When the jacket is to be replaced, the head B will be withdrawn and the jacket slipped off the end of the cylinder. By forming the cylinder-head B of greater diameter than the annular rib $a$ at the end of the cylinder this head serves not only to retain the jacket in place, but also by its bearing against the packing-ring insures a water-tight joint between the jacket and the cylinder.

It will be understood, of course, that the water-space between the jacket D and the cylinder A will be connected with a suitable water-space in the cylinder-head B, preferably by suitable ports $a^6$, as shown by Fig. 5.

Having thus described my invention, what I claim as new, and desire to secure by Letters Patent, is—

1. A gas-engine the cylinder whereof is provided at its ends with raised annular ribs or flanges, and at its inner end with a raised part extending beyond the adjacent rib or flange, a jacket resting upon said flanges and having beveled ends terminating inside the cylinder-head and said raised part, packing-rings encircling said flanges of the cylinder and bearing against the beveled ends of the jacket, and a cylinder-head having its face abutting against the packing-ring that rests upon the flange at the outer end of the cylinder, substantially as described.

2. In an engine the combination with a cylinder provided at its ends with raised annular ribs or flanges and at its front end with a cylinder-head and having a raised shoulder adjacent the inner annular rib or flange, of a jacket formed of longitudinal sections shorter than the space between said raised shoulder and the cylinder-head, packing-rings encircling said ribs or flanges of the cylinder and against which the end portions of said jacket-sections bear and means for clamping said sections securely against said packing-rings and together whereby water-tight joints are formed at the ends of the jacket-sections and whereby the jacket-sections can be removed without disturbing the remaining parts, substantially as described.

3. In an engine the combination with a cylinder provided at its ends with suitable raised annular ribs or flanges, of a jacket formed of longitudinal sections having beveled ends, packing-rings encircling said flanges of the cylinder and bearing against the beveled ends of said jacket-sections and bolts for clamping said jacket-sections against said ring, substantially as described.

4. In an engine the combination of a cylinder provided upon its exterior with raised annular ribs or flanges and at its inner end with a raised part adjacent the corresponding annular rib or flange, a jacket formed of longitudinal sections having beveled ends terminating inside the cylinder-head and inside said raised part, said jacket-sections being also formed with grooved opposing edges, packing-rings encircling said flanges or ribs of the cylinder and bearing against the beveled ends of the jacket-sections, a cylinder-head having its face abutting against the packing-ring that rests against the flange at the outer end of the cylinder and means for clamping said jacket-sections upon said packing-rings, substantially as described.

WILLIAM F. DAVIS.

Witnesses:
MILTON P. DAVIS,
THOMAS CASEADEN, Jr.